United States Patent
Araki et al.

(10) Patent No.: US 9,690,845 B2
(45) Date of Patent: Jun. 27, 2017

(54) SYSTEM FOR GENERATING INDEX RESISTANT AGAINST DIVULGING OF INFORMATION, INDEX GENERATION DEVICE, AND METHOD THEREFOR

(75) Inventors: Toshinori Araki, Tokyo (JP); Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 588 days.

(21) Appl. No.: 14/233,662

(22) PCT Filed: Jul. 27, 2012

(86) PCT No.: PCT/JP2012/069116
§ 371 (c)(1),
(2), (4) Date: Jan. 17, 2014

(87) PCT Pub. No.: WO2013/018683
PCT Pub. Date: Feb. 7, 2013

(65) Prior Publication Data
US 2014/0129567 A1    May 8, 2014

(30) Foreign Application Priority Data
Jul. 29, 2011 (JP) .................. 2011-166749

(51) Int. Cl.
*G06F 17/30* (2006.01)
*G06F 7/00* (2006.01)
(Continued)

(52) U.S. Cl.
CPC .. *G06F 17/30622* (2013.01); *G06F 17/30946* (2013.01); *G06F 21/6218* (2013.01); *H04L 9/30* (2013.01)

(58) Field of Classification Search
CPC ......... G06F 17/30321; G06F 17/30622; G06F 17/30613; G06F 17/3002; G06F 17/30336; G06F 17/30619; G06F 17/30631
See application file for complete search history.

(56) References Cited

U.S. PATENT DOCUMENTS

| 6,687,688 B1 | 2/2004 | Fujihara et al. |
| 7,532,989 B1 * | 5/2009 | Torosyan ......... G01R 31/31725 327/108 |

(Continued)

FOREIGN PATENT DOCUMENTS

| JP | 11-328225 A | 11/1999 |
| JP | 2005-134990 A | 5/2005 |

(Continued)

OTHER PUBLICATIONS

International Search Report in PCT/JP2012/069116 dated Oct. 23, 2012 (English Translation Thereof).

(Continued)

*Primary Examiner* — Dung K Chau
(74) *Attorney, Agent, or Firm* — McGinn IP Law Group, PLLC

(57) ABSTRACT

In the present invention, scope search can be effectively performed in a database having encrypted registration information. A plurality of values, first identification information to identify the plurality of values, and a key are accepted as input. A value group is generated from the plurality of values. The value group is treated as a word group, and a secure index is generated from the word group, the first identification information, and the key. On the basis of a value to be retrieved and a key, trapdoor information for the value to be retrieved is generated. With respect to the generated secure index, a secure index assessment process is performed using the trapdoor information. When the value (Continued)

to be retrieved is assessed to be contained in the secure index as a result of the assessment process, second identification information to identify the secure index is output.

11 Claims, 8 Drawing Sheets

(51) Int. Cl.
  *H04L 9/30* (2006.01)
  *G06F 21/62* (2013.01)

(56) References Cited

U.S. PATENT DOCUMENTS

| | | | |
|---|---|---|---|
| 7,689,547 | B2 | 3/2010 | Cristofor et al. |
| 8,046,368 | B2 | 10/2011 | Ohi et al. |
| 8,281,153 | B2 | 10/2012 | Kang et al. |
| 2006/0041533 | A1* | 2/2006 | Koyfman .......... G06F 17/30312 |
| 2008/0133935 | A1* | 6/2008 | Elovici ............... G06F 21/6227 713/193 |
| 2008/0195597 | A1* | 8/2008 | Rosenfeld ......... G06F 17/30017 |
| 2009/0136026 | A1* | 5/2009 | Celik ..................... G06T 1/005 380/42 |
| 2009/0300351 | A1* | 12/2009 | Lei .................... G06F 17/30864 713/165 |
| 2010/0146299 | A1* | 6/2010 | Swaminathan ... G06F 17/30666 713/189 |
| 2010/0169321 | A1* | 7/2010 | Wang .................. G06F 21/6227 707/741 |
| 2010/0185847 | A1* | 7/2010 | Shasha ................ G06F 11/1004 713/150 |
| 2011/0026781 | A1* | 2/2011 | Osadchy ............ G06K 9/00221 382/118 |
| 2012/0263298 | A1* | 10/2012 | Suh ...................... H04W 4/003 380/255 |

FOREIGN PATENT DOCUMENTS

| | | |
|---|---|---|
| JP | 2006-163995 A | 6/2006 |
| JP | 2008-276550 A | 11/2008 |
| JP | 2010-503118 A | 1/2010 |
| JP | 2010-506289 A | 2/2010 |
| JP | 2010-164835 A | 7/2010 |
| WO | WO 2010/124363 A1 | 11/2010 |

OTHER PUBLICATIONS

Alexandra Boldyreva, Nathan Chenette, Younho Lee and Adam O'Neill. "Order-Preserving Symmetric Encryption". Advances in Cryptology—Eurocrypt 2009 Proceedings, Lecture Notes in Computer Science vol. 5479, pp. 224-241, A. Joux ed., 2009.
Eu-Jin Goh: "Secure Indexes". [online], [searched Jul. 15, 2011] the Internet <http://crypto.stanford.edu/~eujin/papers/secureindex/secureindex.pdf>.
Y.-C. Chang and M. Mitzenmacher. "Privacy preserving keyword searches on remote encrypted data". Cryptology ePrint Archive, Report 2004/051, Feb. 2004 [online], [searched Jul. 15, 2011] the Internet <http://eprint.iacr.org/2004/051/>.
Takanori Suga et al., "Design, Implementation and Evaluation of Symmetric Key Encryption with Flexible Keyword Search by Using Bloom Filter", IPSJ SIG Notes, 2011 (Heisei 23) Nendo (1), Jul. 5, 2011 (Jul. 5, 2011) (received date), pp. 1 to 6.
Hiromasa Omura et al., "An Information Flow Analysis of Programs with Cryptographic Functions", Computer Security Symposium 2003, Oct. 29, 2003 (Oct. 29, 2003), vol. 2003, No. 15, pp. 277 to 282.
Extended European Search Report dated Mar. 26, 2015.
Hyun-A Park, et al.: "Efficient Keyword Index Search Over Encrypted Documents of Groups", Intelligence and Security Informatics, 2008. ISI 2008. IEEE International Conference ON, IEEE, Piscataway, NJ, USA Jun. 17, 2008, pp. 225-229, XP031286474, ISBN: 978-1-4244-2414-6.
Reza Curtmola, et al.: "Searchable Symmetric Encryption: Improved Definitions and Efficient Constructions", International Association for Cryptologic Research, vol. 20110420:005403, Apr. 20, 2011, pp. 1-33, XP061002133 [retrieved on Apr. 20, 2011].
Erez Shmueli, et al.: "Designing Secure Indexes for Encrypted Databases", Aug. 21, 2005, Data and Applications Security XIX; [Lecture Notes in Computer Science; LNCS], Speinger-Verlag, Berlin/Heidelberg, pp. 54-68, XP019013760, ISBN: 978-3-540-28138-2.

* cited by examiner

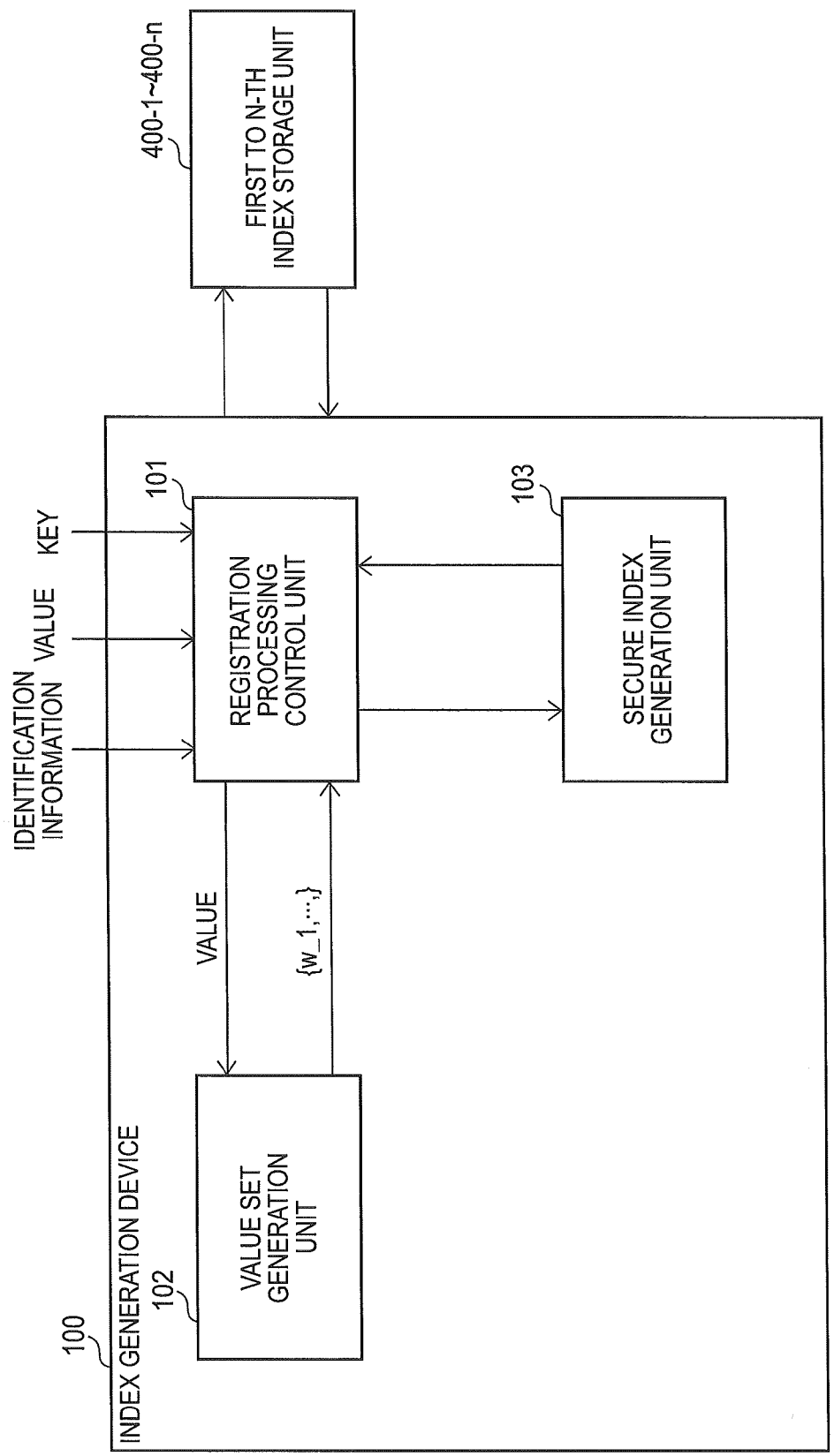

SYSTEM FOR GENERATING INDEX RESISTANT AGAINST DIVULGING OF INFORMATION, INDEX GENERATION DEVICE, AND METHOD THEREFOR

TECHNICAL FIELD

The present invention relates to a system for generating an index that is resistant against divulging of information, an index generation device, and a method therefor.

BACKGROUND ART

Technology using an "index", a piece of data generated for a set of data, is known. By using an index, it becomes easy to search a data set from which the index is generated for a piece of data having intended attributes.

Typical search methods by use of an index include a keyword search and a scope search. The scope search will be particularly considered here. In the case of carrying out a scope search on normal data which are not encrypted, a simple comparison in small-and-large relation suffices; any specific method is not necessary.

When data are encrypted as a countermeasure against divulging of information, comparison in small-and-large relation of original data using an encrypted text encrypted with a general encryption method is not possible. PTLs 1 to 5, for example, disclose technologies in which a database is created after data to be stored are encrypted, keywords that are search keys are encrypted, and so on. By encrypting data as disclosed in the literatures, divulging of information from encrypted messages can be prevented. However, carrying out a scope search on data encrypted with these technologies is not possible.

To carry out a scope search on encrypted data, another technology is thus needed.

In the description below, a technology for carrying out search processing on data while encrypting the data is described in detail.

NPL 1 discloses an encryption method by which a plain text can be encrypted while a numerically small-and-large relation in the text is maintained. The method described in NPL 1, however, has a drawback that order information itself is divulged from an encrypted message.

By the technologies using indexes, disclosed in NPL 2 and NPL 3, not only divulging of information from encrypted texts is prevented but also divulging of information from the indexes can be prevented.

CITATION LIST

Patent Literature

{PTL 1} JP-A-2005-134990
{PTL 2} JP-A-2010-164835
{PTL 3} JP-A-11-328225
{PTL 4} JP-A-2010-503118
{PTL 5} JP-A-2010-506289

Non-Patent Literature

{NPL 1} Alexandra Boldyreva, Nathan Chenette, Younho Lee and Adam O'Neill. Order-Preserving Symmetric Encryption. Advances in Cryptology—Eurocrypt 2009 Proceedings, Lecture Notes in Computer Science Vol. 5479, pp. 224-241, A. Joux ed., 2009.

{NPL 2} Eu-Jin Goh: Secure Indexes [online], [searched Jul. 15, 2011] the Internet <http://crypto.stanford.edu/~eujin/papers/secureindex/secureindex.pdf>

{NPL 3} Y.-C. Chang and M. Mitzenmacher. Privacy preserving keyword searches on remote encrypted data. Cryptology ePrint Archive, Report 2004/051, February 2004 [online], [searched Jul. 15, 2011] the Internet <http://eprint.iacr.org/2004/051/>

SUMMARY OF INVENTION

Technical Problem

With encrypting data by use of the above-described technologies, it becomes possible to have a countermeasure against divulging of information. It also becomes possible to carry out a keyword search on encrypted data.

However, the above-described technologies are configured for a keyword search and not appropriate for a scope search. That is because a basic comparison of encrypted values cannot be carried out when the data are encrypted in a countermeasure against divulging of information or the like.

It is an object of the present invention to provide an index generation system, an index generation device, and a method therefor that are resistant against divulging of information and make it possible to carry out a scope search efficiently on a database in which registered information is encrypted.

Solution to Problem

According to a first aspect of the present invention, a secure index generation device that receives a plurality of values, first identification information for identifying each of the plurality of values, and a key as inputs and generates a secure index based on the inputs, the secure index generation device including: a value set generation unit that generates a value set based on the plurality of values; and a secure index generation unit that treats the value set as a word set and generates a secure index based on the word set, the first identification information, and the key, is provided.

According to a second aspect of the present invention, a search system that generates a secure index and performs assessment processing on the generated secure index, the search system including: a unit in which the index generation device according to the first aspect of the present invention generates a secure index; a trapdoor generation unit that, based on the key and a value to be searched, generates trapdoor information of the value to be searched; and a secure index search unit that, by use of the trapdoor information, performs secure index assessment processing to the generated secure index and, in a case where it is assessed through the assessment processing that the value to be searched is contained in the secure index, outputs second identification information for identifying the secure index, is provided.

According to a third aspect of the present invention, a search method in which a plurality of values, first identification information for identifying the plurality of values, and a key are received as inputs, a secure index is generated based on the inputs, and assessment processing is performed to the generated secure index, the method which includes: generating a value set based on the plurality of values; by treating the value set as a word set, generating a secure index based on the word set, the first identification information, and the key; based on the key and a value to be searched, generating trapdoor information of the value to be searched;

and by use of the trapdoor information, performing secure index assessment processing to the generated secure index and, in a case where it is assessed through the assessment processing that the value to be searched is contained in the secure index, outputting second identification information for identifying the secure index, is provided.

Advantageous Effects of the Invention

According to the present invention, converting a value to a set of a plurality of values and generating a secure index using the set of values as a word set make it possible to prevent divulging of information and to perform a scope search efficiently on a database in which registered information is encrypted.

BRIEF DESCRIPTION OF DRAWINGS

FIG. 4. A figure illustrates a basic configuration of an index generation device of the embodiment of the present invention.

REFERENCE SIGNS LIST

- 10 Processing device
- 11 CPU
- 12 Main memory
- 13 Recording medium
- 14 Data storage device
- 15 Memory control interface unit
- 16 I/O interface unit
- 17 Bus
- 20 Input device
- 30 Output device
- 100 Index generation device
- 101 Registration processing control unit
- 102 Value set generation unit
- 103 Secure index generation unit
- 200 Search request device
- 201 Trapdoor generation unit
- 300 Search device
- 301 Search processing control unit
- 302 Secure index assessment unit

DESCRIPTION OF EMBODIMENTS

Referring to the accompanying drawings, an embodiment of the present invention will be described in detail.

Figure 1:
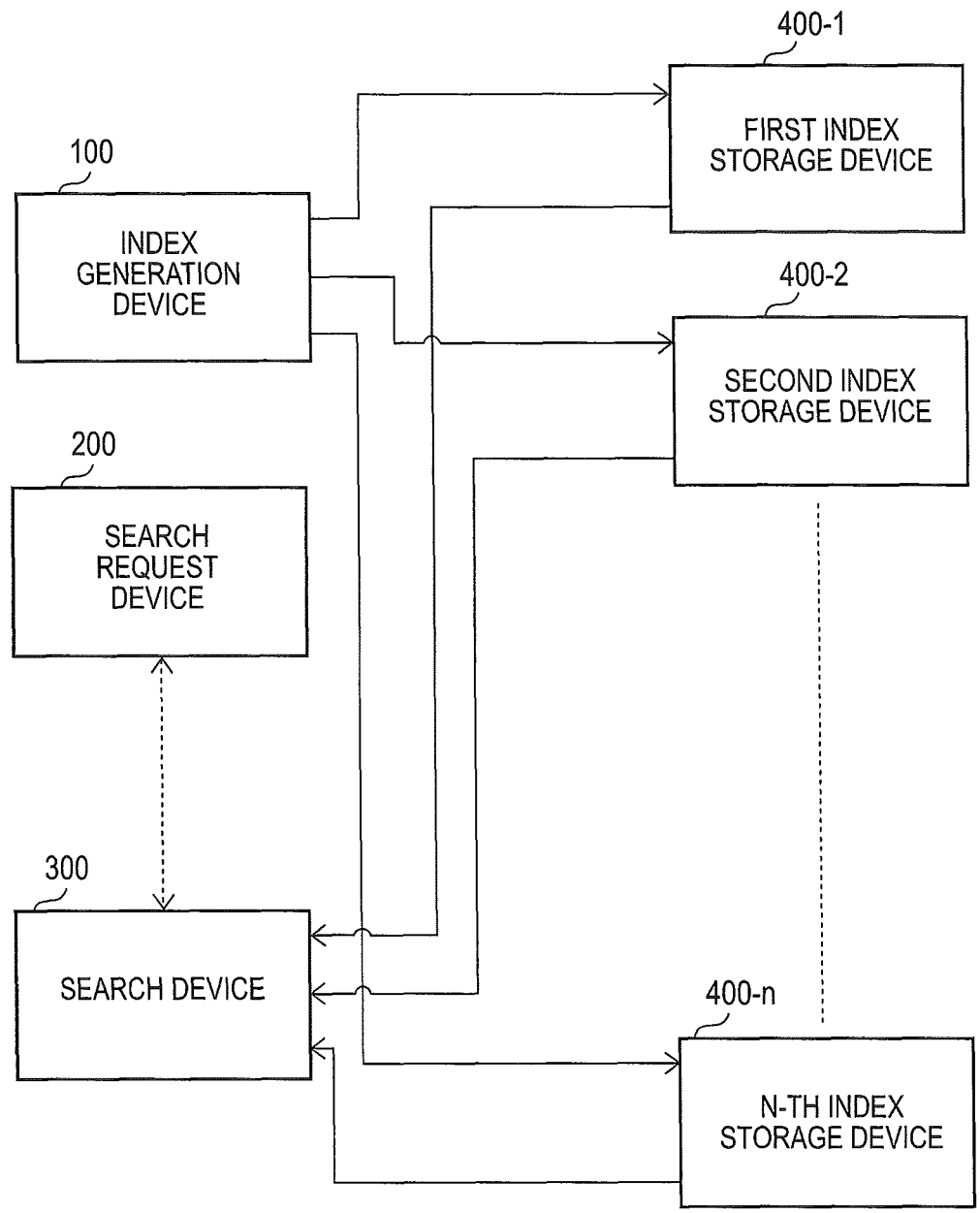
FIG. 1. A figure illustrates a basic configuration of an entire embodiment of the present invention.

FIG. 1 is a block diagram illustrating a basic configuration of the embodiment.

With reference to FIG. 1, the embodiment has an index generation device 100, a search request device 200, a search device 300 and an index storage device 400. The index storage device 400 may be a single device or configured with a plurality of devices. In the embodiment, an index storage device 400-1, an index storage device 400-2, and an index storage device 400-$n$ are shown. Although three devices are shown for the sake of convenience, it does not mean there is a constraint on the number of usable index storage devices 400. In the embodiment, any number of the index storage devices 400 can be used.

The index generation device 100 is a device that generates a secure index. The search request device 200 is a device that generates information for the search device 300 to carry out a search. The search device 300 is a device that carries out a search in response to a request from the search request device 200. The index storage device 400 is a device that stores identification information and an index generated by the index generation device 100.

Next, an index generation method and assessment method will be described in detail before describing a configuration of each device in the embodiment.

In the embodiment, an index or the like for a scope search is generated by applying an index generation method described in NPL 2, which is configured for a keyword search. The index generation method which is applied in the embodiment and is described in NPL 2 will be described hereinafter.

In this index generation method, a combination of a set of words and identification information is treated as a document. Any type of information, e.g. a file name and a serial number, can be used as identification information if each piece of identification information is distinguished from others.

A document D that has identification information $z$ and words $w\_1$ to $w\_n$ is denoted by $(\{w\_1, \ldots, w\_n\}, z)$.

A piece of secret information that is owned by only an entity who generates an index is used as a key. The key is referred to as "key K" in the following description.

The key K is used for converting each word $w$ contained in the document D to a value referred to as a trapdoor. This conversion processing is carried out with a function which takes the key and the word as input values. This function is defined as a trapdoor generation function Tr. An output of the function from an input of the key K and the word $w$ is defined as a trapdoor of the word $w$. The processing for generating a trapdoor by use of the trapdoor generation function Tr will be, hereinafter, referred to as trapdoor generation processing.

In the index generation method, a different filter function is used for each word. The filter function is a function that outputs a bit string and is defined by a function that takes identification information $z$ and a trapdoor of a word $w$ as its input. This type of function will be referred to as an "identification information dependent filter function F".

If a function that generates an index is denoted as "index generation function Gen", the index generation function Gen is defined as follows.

Index generation function Gen:
1. Input a document $(\{w\_1, \ldots, w\_n\}, z)$ and a key K.
2. Compute $x\_1 = Tr(k, w\_1)$. Similarly, compute $x\_2 = Tr(k, w\_2), \ldots, x\_n = Tr(k, w\_n)$.
3. Compute $y\_1 = F(z, x\_1)$. Similarly, compute $y\_2 = F(z, x\_2), \ldots, y\_n = F(z, x\_n)$.

4. Compute a logical OR of y_1 to a logical OR of y_n respectively and output each of them.

A filter generated by the above processing is referred to as a secure index. In the embodiment, this processing is defined as "secure index generation processing".

Figure 2:
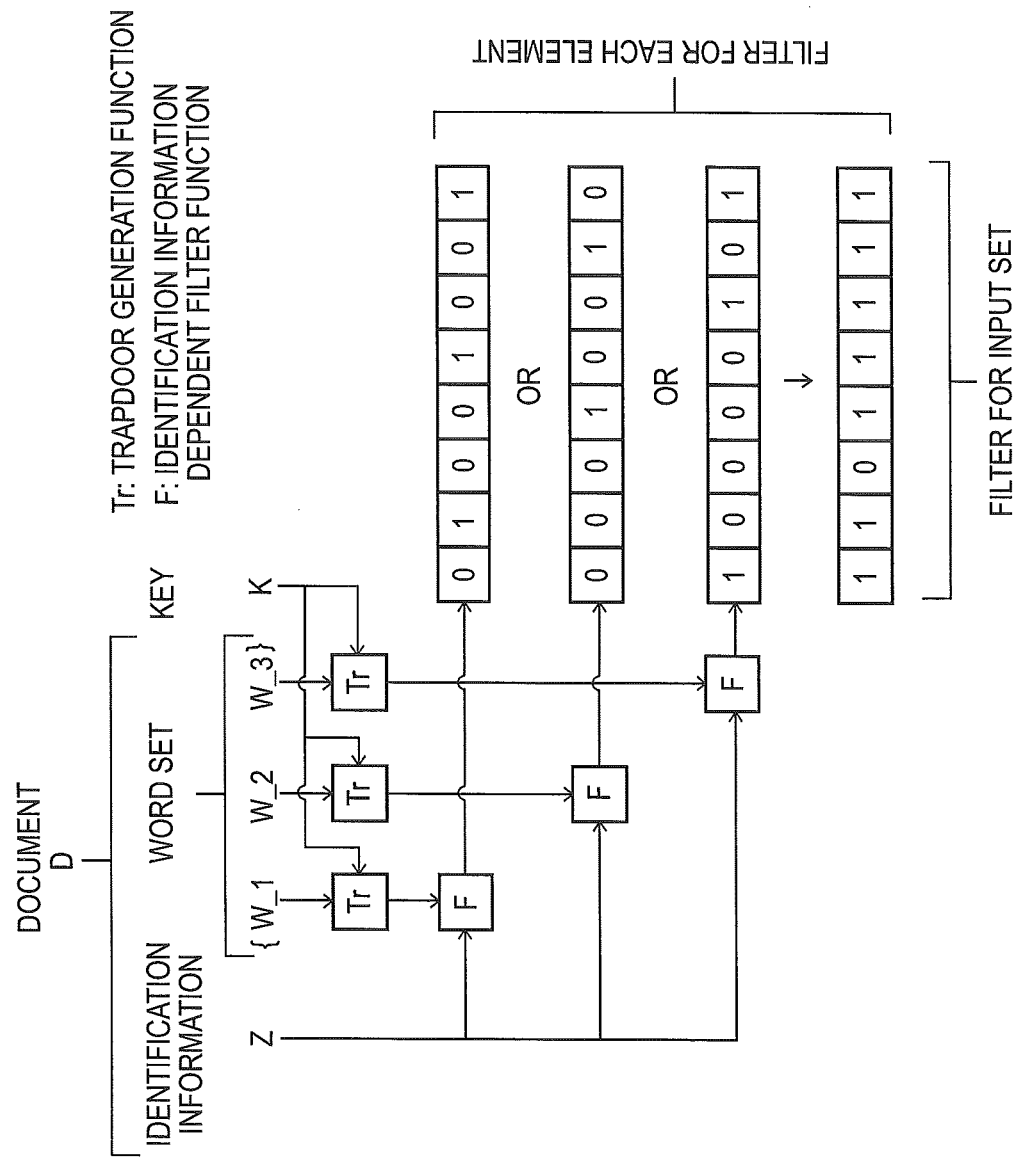
FIG. 2. A figure illustrates a generation method of a secure index.

FIG. 2 shows a processing flow for a case in which a document ({w_1, w_2, s_3}, z) and a key K are input to the index generation function Gen.

Next, processing to assess whether or not a secure index f with respect to identification information z contains a word w will be described below. An assessment function Check for carrying out this assessment processing takes a trapdoor, a filter, and identification information as inputs and can be defined as follows.

Assessment function Check:
1. Input an index f, identification information z, and a trapdoor x.
2. Compute y=F'(z, x).
3. Test if all elements in y that take 1 also take 1 in the index f. Output 1 if so; Otherwise, output 0.

In the embodiment, this processing is defined as "secure index assessment processing".

Figures 3A, 3B:
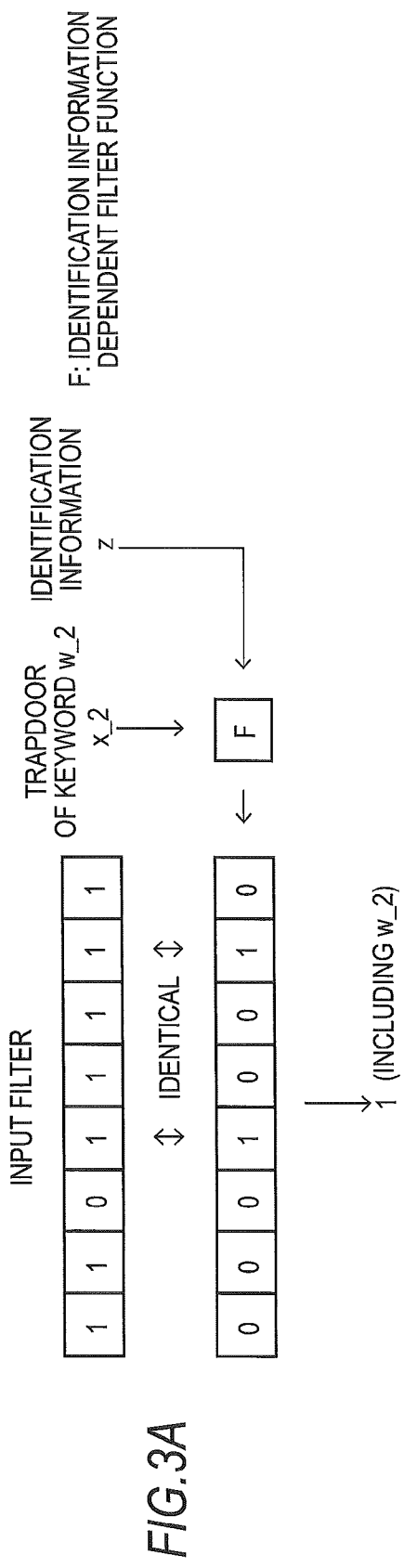
FIG. 3. A figure illustrates an assessment method of a secure index.

FIG. 3 shows an example of the operation of the assessment function Check.

A trapdoor is computed using a word and a key. Therefore, even if a search with respect to a word is tried, the trapdoor corresponding to the word cannot be computed without the key; the assessment function Check thus cannot be used.

Only an entity which has the key can compute a trapdoor corresponding to the word and request a search processing to a database or the like that stores the document and filter.

That is, only a search in which a key is known and a trapdoor can be computed with the key can be carried out for a secure index.

For the aforementioned reasons, the secure index is resistant against divulging of information from the data themselves. The secure index further has another characteristic feature.

The feature is such that the assessment function Check always outputs 1 for the secure index computed for a set containing an input element w_i whereas it may output 1 even for a secure index for a set which does not contain the element w_i.

By utilizing this feature, defining a document as a set of words, generating a secure index the input of which is the set of words, and storing an encrypted text of the document with the corresponding secure index make a keyword search for an encrypted document more efficient.

That is because by assessing whether or not a secure index corresponding to each document contains a keyword with the assessment function Check and selecting the document corresponding the secure index that outputs 1, it is not necessary to check directly whether or not each document contains the keyword.

This point will be described in detail below. In the embodiment, the problem is solved by converting characteristics of data to a set of a plurality of words and generating a secure index with the set of words regarded as a document.

For example, in the case of making a search for an assertion that a value x is equal to or greater than a threshold k, a secure index is generated by converting the value x to $\{1, \ldots, x\}$ and regarding $\{1, \ldots, x\}$ as a set of words.

When secure index assessment processing with a keyword k is carried out for a secure index generated as described above, the output is 1 if x is equal to or greater than k. Unless an error occurs in the secure index, if x is less than k, the output is 0.

As shown above, an index with which a search for a condition "equal to or greater than" is carried out can be generated by converting a value x to a set $\{1, \ldots, x\}$. Similarly, an index for a condition "equal to or less than" can be generated.

Specifically, for a search to assess that a value x is equal to or less than a threshold k, the value x is converted to a set $\{x, \ldots,$ a value that is the maximum in the range of x and is equal to or greater than k$\}$ and a secure index is generated by using the set $\{x, \ldots,$ a value that is the maximum in the range of x and is equal to or greater than k$\}$ as a set of words.

In the case that secure index assessment processing with a keyword k is carried out for the secure index generated as described above, if x is equal to or less than k, the output is 1. Unless an error occurs in the secure index, if x is greater than k, the output is 0.

If, for a value, an index of "equal to or greater than" and an index of "equal to or less than" are generated as described above, an index for executing a scope search for a range of values equal to or greater than A and equal to or less than B can also be generated.

In this method, when a value equal to or greater than A is searched, a value assessed not to be equal to or greater than A is assessed to be less than A and a value assessed not to be equal to or less than B is assessed to be greater than B.

That is, a value less than A can be distinguished from a value greater than B. In the case that only an element which is truly equal to or greater than A and equal to or less than B needs to be searched, a method by which these cannot be distinguished is appropriate. Such a method includes the method described below.

In this case, if a secure index to carry out a search of being equal to or greater than A and being less than B for a value needs to be generated, generating a secure index that has all ranges including the value as its keywords suffices.

If a range taken by a value is $\{1, 2, 3, 4\}$, for example, the intervals including 3 are 3, $\{2, 3\}$, $\{3, 4\}$, $\{1, 2, 3\}$, $\{2, 3, 4\}$, and $\{1, 2, 3, 4\}$. A secure index that has each of these sets as its element word is generated.

Search processing for the secure index generated according to the above method can be carried out, for example, by use of a trapdoor for a segment $\{2, 3\}$. In this case, if the words from which the secure index is generated include only 1, $\{1, 4\}$, and 4, the output is 0 unless an error occurs on the secure index. Otherwise, the output is 1. Accordingly, it becomes possible to search only an element which is truly equal to or greater than A and equal to or less than B.

That is, in the embodiment, the problem is solved by converting a value to a set of a plurality of values and generating a secure index having the set of values as a word set.

Though application of the method disclosed in NPL 2 is described in the above description, this is just an example and any method, if it is an index generation method with similar features, can be used.

Next, configuration and operation of each device included in the embodiment will be described in detail below.

FIG. 4 is a block diagram illustrating a basic configuration of the index generation device 100 of the embodiment.

With reference to FIG. 4, the index generation device 100 has an index generation control unit 101, a value set generation unit 102, and a secure index generation unit 103.

The index generation control unit 101 receives a value D_value, identification information D_id, and a key K as an input. The index generation control unit 101 generates information to be stored in an index storage device 400 based on these pieces of input information by controlling the value set generation unit 102 and the secure index generation unit 103. With storing generated information in the index storage device 400, information in the index storage device 400 is updated. The value D_value is paired with the identification information D_id. Any type of information, if it does not overlap, can be used as the identification information D_id. The identification information D_id may be a serial number assigned to each value D_value.

The value set generation unit 102 generates a set S of values D_values using values D_values output by the index generation control unit 101 as an input. The value set generation unit 102 then outputs the generated set S to the index generation control unit 101.

The secure index generation unit 103 inputs a key K, identification information D_id, and a set S of values D_values output by the index generation control unit 101 and carries out secure index generation processing according to the input. The secure index generation unit 103 outputs an index I_value generated by the secure index generation processing.

Figure 5:
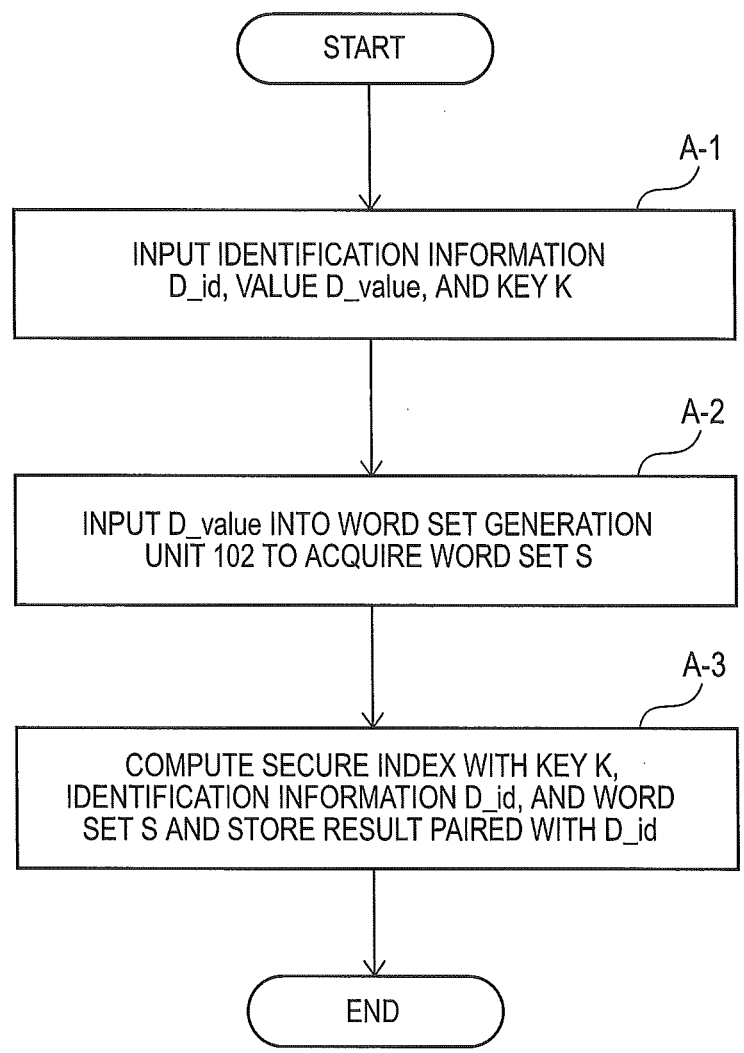
FIG. 5. A figure illustrates a basic operation of the index generation device of the embodiment of the present invention.

FIG. 5 is a flowchart illustrating a basic operation of the index generation device 100 of the embodiment.

With reference to FIG. 5, identification information D_id, a value D_value, and a key K are input to the index generation control unit 101 (step A-1).

The index generation control unit 101 inputs D_value to the value set generation unit 102 and acquires a word set S which is an output of the value set generation unit 102 (step A-2).

The index generation control unit 101 inputs the key K, the identification information D_id, and the word set S to the secure index generation unit 103, pairs an index I_value with identification information I_id, both of which are outputs of the secure index generation unit 103, and stores the pair in the index storage device 402 (step A-3). Any type of information can be used for the identification information I_id, if no overlap occurs, as with the identification information D_id. For example, the identification information I_id may be a serial number assigned to each value I_value.

Figure 6:
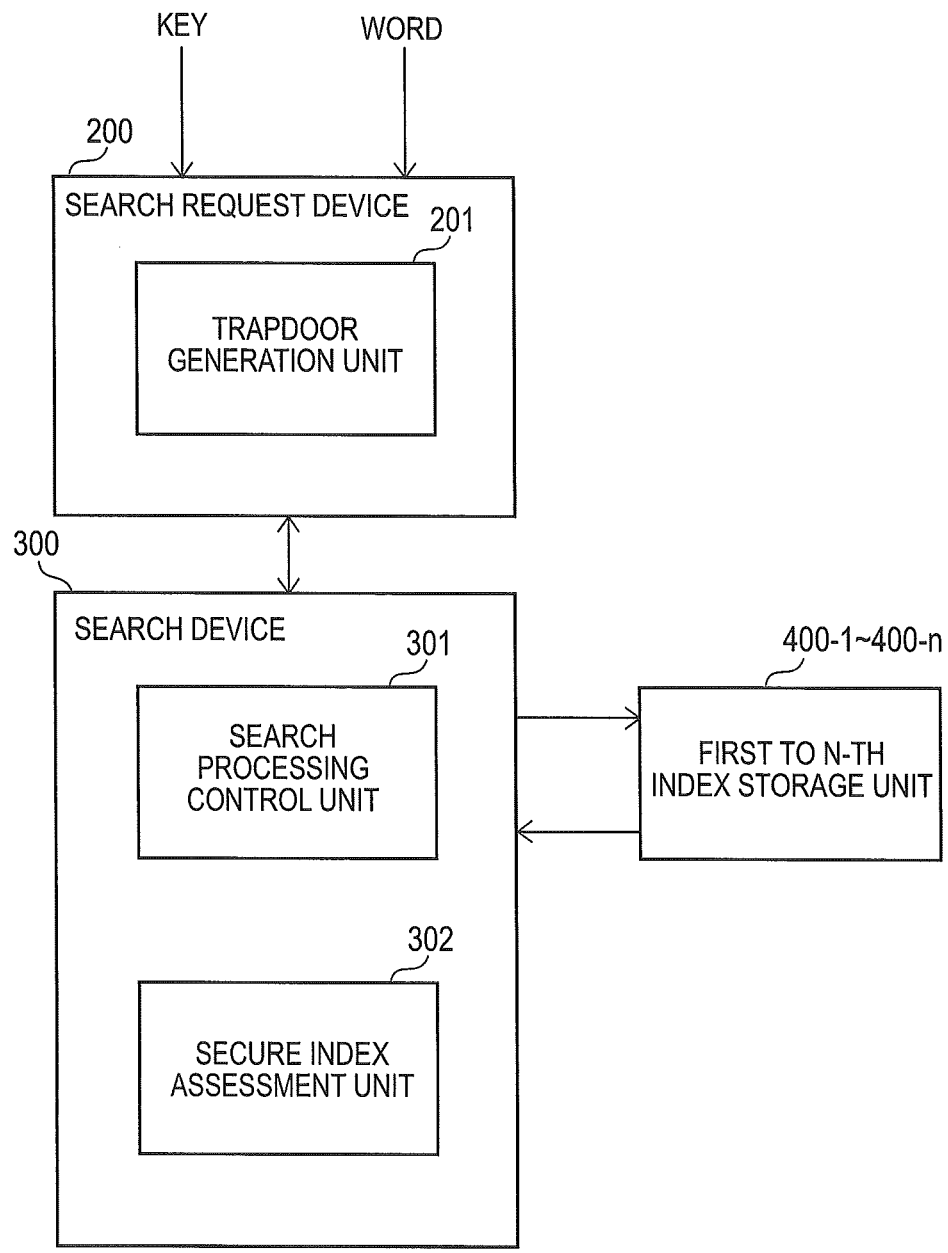
FIG. 6. A figure illustrates basic configurations of a search request device and a search device of the embodiment of the present invention.

FIG. 6 is a block diagram illustrating a basic configuration of a search request device 200 and a search device 300 of the embodiment.

The search request device 200 has a trapdoor generation unit 201.

A key K and a word w are input to the search request device 200. The trapdoor generation unit 201 outputs a trapdoor t for the word w based on the input key K and word w.

The search device 300 has a search processing control unit 301 and a secure index assessment unit 302.

A trapdoor t is input to the search processing control unit 301. The search processing control unit 301 reads out identification information I_id and an index I_value from either of the index storage devices 400-1, 400-2, to 400-*n*. The search processing control unit 301 then outputs the trapdoor t, identification information I_id, and index I_value to the secure index assessment unit 302.

The secure index assessment unit 302 receives the trapdoor t, identification information I_id, and index I_value as an input and carries out secure index assessment processing according to the input. The secure index assessment unit 302 then outputs the result of the secure index assessment processing.

Figure 7:
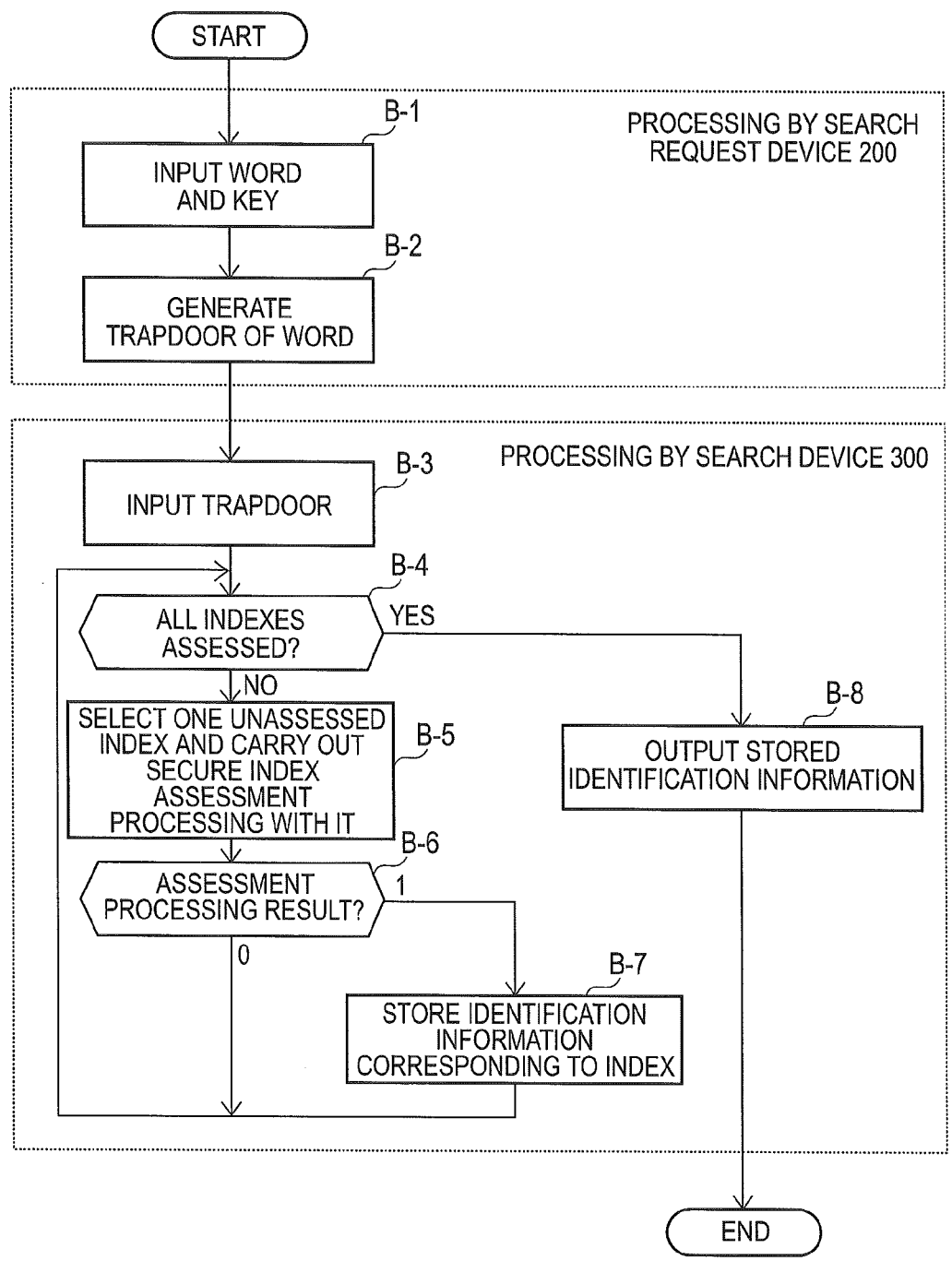
FIG. 7. A figure illustrates basic operations of the search request device and the search device of the embodiment of the present invention.

FIG. 7 is a flowchart illustrating a basic operation of the search request device 200 and the search device 300 of the embodiment.

A word w and a key K are input to the search request device 200 (step B-1).

The trapdoor generation unit 201 generates a trapdoor t for the word w using the word w and key K as its input (step B-2).

The trapdoor t generated in step B-2 is input to the search device 300 (step B-3).

The search processing control unit 301 checks if the secure index assessment processing is carried out to all index information storage devices 400 (step B-4).

If an index information storage device 400 to which the secure index assessment processing is not carried out exists (No in step B-4), the search processing control unit 301 selects the unassessed index information storage device 400, reads out identification information I_id and an index I_value from the index information storage device 400, and outputs I_id as the identification information, t as the trapdoor, and the index I_value as the secure index to the secure index assessment unit 302. The secure index assessment unit 302 carries out secure index assessment processing (step B-5).

If the result of the secure index assessment processing in step B-5 is 0 (0 in step B-6), the process returns to step B-4 and continues the process steps thereafter. If the result of the secure index assessment processing is 1 (1 in step B-6), the identification information I_id corresponding to the index I_value, which is the target of the assessment processing, is stored (step B-7). Then, the process returns to step B-4 and continues the process steps thereafter.

If the secure index assessment processing is carried out to all indexes stored in all index information storage devices 400 in step B-4 (Yes in step B-4), all identification information I_id stored in step B-7 is output.

In the embodiment, it becomes possible, with the above-described operation, to prevent divulging of information and to carry out a scope search efficiently for a database the stored information of which is encrypted.

The above-described index generation device 100, search request device 200, search device 300, and index storage device 400 can be configured with any method.

For example, in the case that the index generation device 100, search request device 200, and search device 300 are materialized in hardware, it is possible to configure them with a semiconductor integrated circuit made of logic circuits or the like such as an LSI (Large Scale Integration) and DSP (Digital Signal Processor).

The index storage device 400 can also be configured as a hardware device that contains any computer-readable storage medium.

Figure 8:
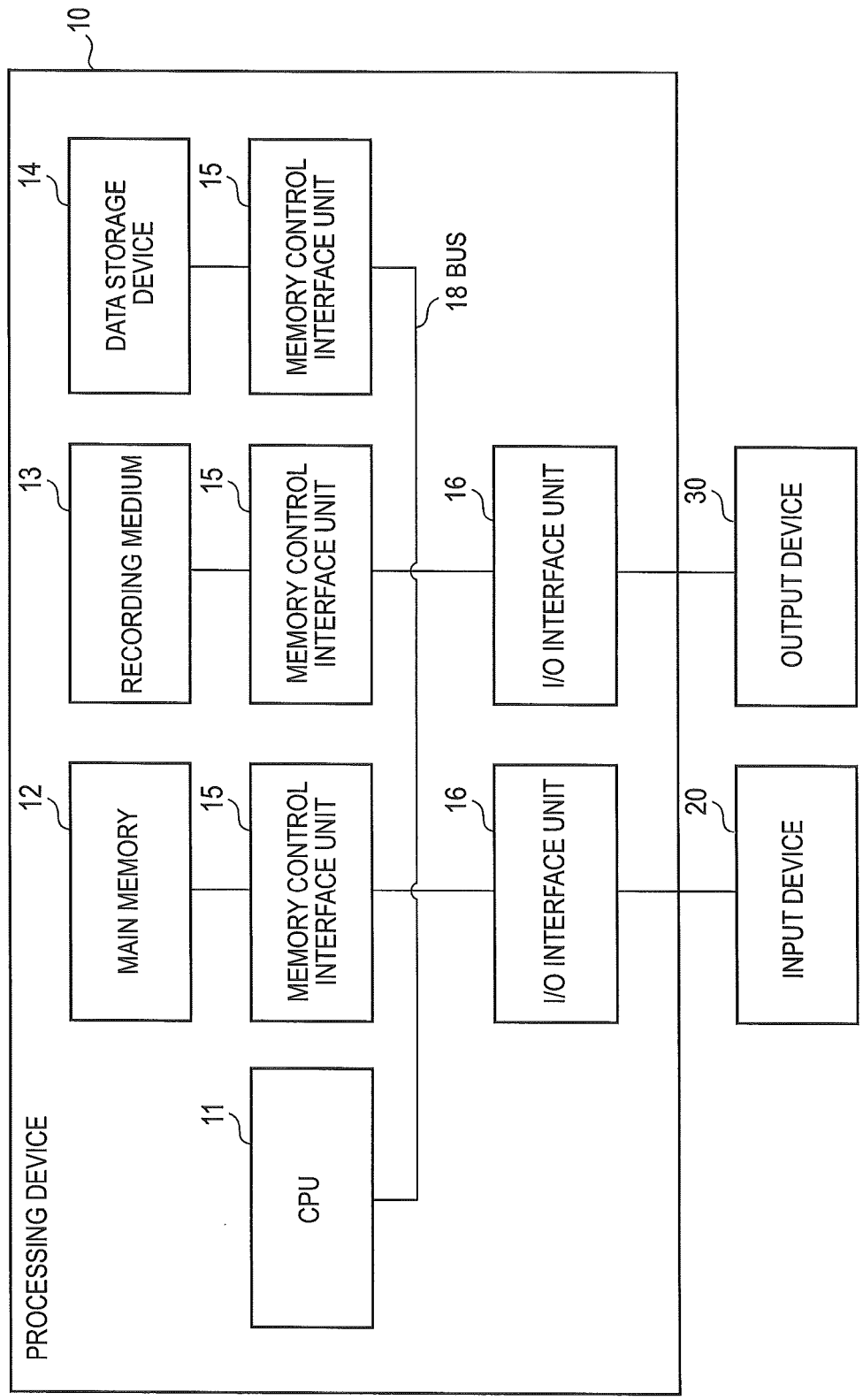
FIG. 8. A figure illustrates a basic configuration of a processing device which is an example of a device for substantializing the embodiment of the present invention.

The index generation device 100, search request device 200, search device 300, and index storage device 400 can also be materialized in a combination of hardware and software. For example, the index generation device 100, search request device 200, search device 300, and index storage device 400 may be configured with a computer that contains a processing device 10, input unit 20, and output unit 30, as shown in FIG. 8.

The processing device 10 is a device which carries out predetermined processing with a program. Such a device may be a general-purpose personal computer.

The input unit 20 is a device for inputting commands and information to the processing device 10 and may be a keyboard or a mouse.

The output unit 30 is a device for monitoring processing results from the processing device 10 and may be a display or a printer.

The processing device 10 will be described in detail below.

With reference to FIG. 4, the processing device 10 has a CPU 11, a main memory unit 12, a recording medium 13, a data storage unit 14, memory control interface units 15, and I/O interface units 16. These component devices are interconnected via a bus 17.

The CPU 11 is an arithmetic processing device that performs computation based on a program. The main memory unit 12 is a main memory that temporally stores information necessary for computational processing by the CPU 11.

The recording medium 13 is a recording medium on which programs for making the CPU 11 carry out processing of the index generation device 100, search request device 200, and search device 300 are recorded. The processing device 10 performs functions of the index generation device 100, search request device 200, and search device 300 with the programs recorded on the recording medium 13.

The data storage unit 14 is an auxiliary storage device on which output data from processing are stored.

The recording medium 13 and data storage unit 14 can be configured with any type of storage device. The recording medium 13 and data storage unit 14 can, for example, be constructed with an HDD (Hard Disk Drive) or Flash SSD (Solid State Drive). These storage devices need not be contained in the processing device 10; external storage devices (not shown) can be used for the storage devices. If an external device is used, a separate computer may be used for the storage device and connected to the processing device 10 via a bus, a cable conforming to the USB (Universal Serial Bus) standard, the Internet, or the like. The storage device may be constructed with a single storage device or configured with a combination of a plurality of storage devices. Furthermore, the recording medium 13 may be a magnetic disk, semiconductor memory, optical disk, or other recording medium. For example, a flexible disk, CD-ROM (Compact Disc Read-Only Memory), DVD (Digital Versatile Disc), MO (Magneto Optical Disk (Disc)), BD (Blu-ray Disc: Registered Trademark), or the like can be used. The data storage unit 14 may be used as the index storage device 400. That is, the index generation device 100, search request device 200, search device 300, and index storage device 400 may be configured with a plurality of computers or constructed on a single computer.

The memory control interface unit 15 controls data transfer between the main memory unit 12, storage medium 13, or data storage unit 14 and the CPU 11 or the like.

EXAMPLE

Examples of the present invention will be described below. The examples correspond to the above-described embodiment of the present invention.

In every example, a value D_value is supposed to be paired with a piece of identification information D_id.

Example 1

Example 1 shows a case in which an index to assess that a value is equal to or greater than a predetermined value is generated.

A value D_value is used as an input in the case. In this case, if the minimum value within a range which the value D_value can take is indicated as D_min, the value set generation unit 102 generates an index using {D_min, . . . , D_value} as a value set S.

In the case of performing a search of "equal to or greater than x", a trapdoor t is generated by defining x to be a word and using a key K. Assessment processing for the secure index is then carried out by use of the trapdoor t of x.

If the search is performed in the way described above, assessment of "equal to or greater than" can be carried out because all secure indexes generated for values D_values equal to or greater than x output 1 and the other secure indexes output 0 as long as no error occurs.

Example 2

Example 2 shows a case in which an index to assess whether or not a value is less than a predetermined value is generated.

A value D_value is supposed to be input in the case. In this case, if the maximum value within a range which the value D_value can take is indicated as D_max, the value set generation unit 102 generates an index using {D_value, . . . , D_max} as a value set S.

In the case of performing a search of "equal to or less than x", a trapdoor t of x is generated by defining x to be a word and using a key K. Assessment processing for the secure index is then carried out by use of the trapdoor t of x.

If the search is performed in the way described above, assessment of "equal to or greater than" can be carried out because all secure indexes generated for values D_values equal to or less than x output 1 and the other secure indexes output 0 as long as no error occurs.

Example 3

Example 3 shows a case in which two indexes to assess that a value is equal to or greater than a predetermined value and that the value is equal to or less than another predetermined value are generated according to the index generation methods of Example 1 and Example 2.

In the case of performing a search for a value which is equal to or greater than A and equal to or less than B, as for the index of "equal to or greater than", an index is generated using {D_min, . . . , D_value} as a value set S in a similar way to Example 1. Index assessment processing is then carried out using A as a word.

As for the index of "equal to or less than", an index is generated using {D_value, . . . , D_max} as a value set S in a similar way to Example 1. Index assessment processing is carried out using B as a word. Decision of "equal to or greater than A" and "equal to or less than B" can be made by assessing that the overall result is 1 if both assessment processing output 1.

Example 4

When the method of Example 3 is used, a bit of information may be divulged, as described in {Solution to Problem}.

Example 4 can be used for a case in which such a small divulgence needs to be avoided.

A value D_value is supposed to be input in the case. The value set generation unit 102 generates an index using, as a value set S, a set of all value ranges that contain D_value within a range of values the value D_value can take.

When a search for a value included in an interval is carried out, the secure index assessment processing is carried out using the interval itself as a word.

Because a value included in an interval corresponds to a secure index generated using the interval as a word, an intended assessment can be made.

Example 5

Example 5 shows a case in which the number of possible values is large. If Examples 1 to 4 are applied to a case in which the number of possible values is one million, the value set generation unit 102 outputs a set containing quite a lot of elements, so computation in the processing is inefficient. Example 5 can be used to prevent such a situation.

In this example, a value is not input to the value set generation unit 102 directly. A partitioning scheme which partitions a range of possible values into an appropriate number of intervals and indicates in which interval the value is contained is introduced.

For example, if ten thousand values are partitioned into a hundred intervals, a partitioning scheme such that the first value to the 100-th value are assigned to the interval 1 can be devised.

It is not necessary to assign the values equally to each interval. The number of assignments can be adjusted according to a purpose. It is possible, for example, to assign values unequally, such as to assign the first value to the 100-th value to the interval 1 and the 101-th value to the 110-th value to the interval 2.

However, the partitioning at the index generation device 100 and the partitioning at the search device 300 need to be done according to the same rule. Therefore, the index generation device 100 and the search device 300 partition values input to each device respectively with the same scheme.

The above-described embodiment and examples according to the present invention have many advantages as described below.

The first advantage is that it becomes possible to prevent divulging of information and to carry out a scope search efficiently for a database the stored information of which is encrypted.

That is because a value is converted to a set of a plurality of values and a secure index having the set of values as the word set is generated.

The second advantage is that an index to assess that a value is equal to or greater than a predetermined value can be generated.

That is because, if the minimum value within a range which a value D_value can take is indicated as D_min, an index is generated using {D_min, . . . , D_value} as a value set S.

The third advantage is that an index to assess whether or not a value is less than a predetermined value can be generated.

That is because, if the maximum value within a range which a value D_value can take is indicated as D_max, an index is generated using {D_value, . . . , D_max} as a value set S.

The fourth advantage is that it is possible to search an element which is equal to or greater than A and equal to or less than B.

That is because an index is generated using {D_min, . . . , D_value} as a value set S and another index is generated using {D_min, . . . , D_value} as a value set S.

The fifth advantage is that it is possible to prevent divulging of information and to search only an element which is equal to or greater than A and equal to or less than B.

That is because an index is generated using, as a value set S, a set of all value ranges that contain D_value within the range of values the value D_value can take. That is also because when a search for a value included in an interval is carried out, the secure index assessment processing is carried out using the interval itself as a word.

The sixth advantage is that it is possible to carry out an assessment efficiently.

That is because a partitioning scheme which partitions a range of possible values into an appropriate number of intervals and indicates in which interval the value is contained is introduced.

Although the above-described embodiment is a preferred embodiment of the present invention, the breadth and scope of the present invention should not be limited to the above described embodiment and other embodiment with numerous modifications can be made within the scope not departing from the principles of this invention.

Each of the above-described index generation device, search request device, search device, and index storage device can be materialized in hardware, software, or a combination thereof. The index generation method carried out by the above-described index generation device, search request device, search device, and index storage device can also be actualized with hardware, software, or a combination thereof. In the above description, that the index generation method is actualized with software means that the method is carried out by a computer reading in a program and executing it.

A program can be stored using various types of non-transitory computer readable media and provided to a computer. The non-transitory computer readable medium includes various types of tangible storage media. Examples of non-transitory computer readable media include a magnetic recording medium (e.g. flexible disk, magnetic tape, hard disk drive), magnetooptical medium (e.g. magnetooptical disk), CD-ROM (Read Only Memory), CD-R, CD-R/W, semiconductor memory (e.g. mask ROM, PROM (Programmable ROM), EPROM (Erasable PROM), flash ROM, and RAM (Random Access Memory)). A program can also be provided to a computer with various types of transitory computer readable media. Examples of transitory computer readable media include an electrical signal, optical signal, and electromagnetic wave. Transitory computer readable media can provide a computer with programs via a wire communication channel such as electric wire and optical fiber or a wireless communication channel.

This application is based upon and claims the benefit of priority, according to the Paris Convention, from Japanese Patent Application No. 2011-166749, filed on Jul. 29, 2011. The entire disclosure of Japanese Patent Application No. 2011-166749 is incorporated herein in its entirety by reference.

Though the invention has been described with respect to a specific preferred embodiment, it should be understood that numerous changes, substitutions, and alternatives can be devised without departing from the spirit and scope of the principles of the invention defined in the claims. Moreover, applicants intend that even if the claims are modified in the application procedure, the range of equivalency of the claims of the invention is to be embraced.

The whole or a part of the embodiments described above may be described as the following supplementary notes, but is not limited thereto.

{Supplementary Note 1} A secure index generation device that receives a plurality of values, first identification information for identifying each of the plurality of values, and a key as inputs and generates a secure index based on the inputs, including:

a value set generation unit configured to generate a value set based on the plurality of values; and a secure index generation unit configured to treat the value set as a word set and generate a secure index based on the word set, the first identification information, and the key.

{Supplementary Note 2} The index generation device of supplementary note 1, wherein in a case where a minimum amount that can be taken by the value is defined as a minimum value, the index generation device treats a set of more than one value from the minimum value to the value as a word set and generates a secure index based on the word set, the first identification information, and the key.

{Supplementary Note 3} The index generation device of supplementary note 1, wherein in a case where a maximum amount that can be taken by the value is defined as a maximum value, the index generation device treats a set of more than one value from the maximum value to the value as a word set and generates a secure index based on the word set, the first identification information, and the key.

{Supplementary Note 4} A search system that generates a secure index and performs assessment processing on the generated secure index, including:

a unit in which the index generation device of any one of supplementary notes 1 to 3 generates a secure index;

a trapdoor generation unit configured to, based on the key and a value to be searched, generate trapdoor information of the value to be searched; and a secure index search unit configured to, by use of the trapdoor information, perform secure index assessment processing to the generated secure index and, in a case where it is assessed through the assessment processing that the value to be searched is contained in the secure index, output second identification information for identifying the secure index.

{Supplementary Note 5} The index generation device of supplementary note 1, wherein in a case where a minimum amount that can be taken by the value is defined as a minimum value, the index generation device treats a set of more than one value from the minimum value to the value as a word set and generates a first secure index based on the word set, the first identification information, and the key, and in a case where a maximum amount that can be taken by the value is defined as a maximum value, the index generation device treats a set of more than one value from the maximum value to the value as a word set, generates a second secure index based on the word set, the first identification information, and the key, and pairs the first secure index with the second secure index.

{Supplementary Note 6} A search system that generates a secure index and performs assessment processing on the generated secure index, including the index generation device of supplementary note 5 as a unit that generates the first secure index and the second secure index 2, and further including:

a trapdoor generation unit configured to generate trapdoors t_a and t_b for each of input values a and b which meet the inequality a<b; and a secure index search unit configured to perform secure index assessment processing using the trapdoor t_a as a trapdoor used in search processing with the first secure index and the trapdoor t_b as a trapdoor used in search processing with the second secure index and outputs a product set of results from each performance of assessment processing.

{Supplementary Note 7} The index generation device of supplementary note 1, wherein the index generation device treats, as a word set, a set of all intervals that contain the value within a range of values the value can take and generates a secure index based on the word set, the first identification information, and the key.

{Supplementary Note 8} A search system that generates a secure index and performs assessment processing on the generated secure index, including the index generation device of supplementary note 7 as a unit that generates a secure index, and further including:

a trapdoor generation unit configured to, based on the key and an interval that contains a value to be searched, generate trapdoor information of the value to be searched; and a secure index search unit configured to, by use of the trapdoor information, perform secure index assessment processing to the generated secure index and, in a case where it is assessed through the assessment processing that the interval that contains the value to be searched is contained in the secure index, output second identification information for identifying the secure index.

{Supplementary Note 9} The search system of any one of supplementary notes 4, 6, and 8, wherein a value is assigned to any interval, a set of intervals to which the value is assigned is treated as a word set in place of the value set and a secure index is generated based on the word set, the first identification information, and the key, based on an interval assigned to a value to be searched and a key, trapdoor information of the value to be searched is generated, and by use of the trapdoor information, secure index assessment processing is performed to the generated secure index and, in a case where it is assessed through the assessment processing that the interval that is assigned to the value to be searched is contained in the secure index, second identification information for identifying the secure index is output.

{Supplementary Note 10} A search method in which a plurality of values, first identification information for identifying the plurality of values, and a key are received as inputs, a secure index is generated based on the inputs, and assessment processing is performed to the generated secure index, the method which includes:

generating a value set based on the plurality of values;

treating the value set as a word set and generating a secure index based on the word set, the first identification information, and the key;

based on the key and a value to be searched, generating trapdoor information of the value to be searched; and by use of the trapdoor information, performing secure index assessment processing to the generated secure index and, in a case where it is assessed through the assessment processing that the value to be searched is contained in the secure index, outputting second identification information for identifying the secure index.

{Supplementary Note 11} The search method of supplementary note 10, wherein in a case where a minimum amount that can be taken by the value is defined as a minimum value, a set of more than one value from the minimum value to the value is treated as a word set and a secure index is generated based on the word set, the first identification information, and the key.

{Supplementary Note 12} The search method of supplementary note 10, wherein in a case where a maximum amount that can be taken by the value is defined as a maximum value, a set of more than one value from the maximum value to the value is treated as a word set and a secure index is generated based on the word set, the first identification information, and the key.

{Supplementary Note 13} An index generation program installed in a secure index generation device that receives a plurality of values, first identification information for identifying each of the plurality of values, and a key as inputs and generates a secure index based on the inputs, the index generation program making a computer function as the secure index generation device including: a value set generation unit configured to generate a value set based on the plurality of values; and a secure index generation unit configured to treat the value set as a word set and generate a secure index based on the word set, the first identification information, and the key.

{Supplementary Note 14} An index generation program of supplementary note 13, wherein in a case where a minimum amount that can be taken by the value is defined as a minimum value, a set of more than one value from the minimum value to the value is treated as a word set and a secure index is generated based on the word set, the first identification information, and the key.

{Supplementary Note 15} An index generation program of supplementary note 13, wherein in a case where a maximum amount that can be taken by the value is defined as a maximum value, a set of more than one value from the maximum value to the value is treated as a word set and a secure index is generated based on the word set, the first identification information, and the key.

The invention claimed is:

1. A secure index generation device that receives a plurality of values, first identification information for identifying each of the plurality of values, and a key as inputs and generates a secure index based on the inputs, comprising:
   a value set generation unit configured to generate a value set based on the plurality of values, the value set being determined so as to correspond to a condition for a scope search; and
   a secure index generation unit configured to treat the value set as a word set and generate a secure index based on the word set, the first identification information, and the key,
   wherein:
      the secure index generation device treats a set of more than one value from the minimum value to the value as a word set and generates a secure index based on the word set, the first identification information, and the key, in a case where a minimum amount that can be taken by the value is defined as a minimum value, or
      the secure index generation device treats a set of more than one value from the maximum value to the value as a word set and generates a secure index based on the word set, the first identification information, and the key, in a case where a maximum amount that can be taken by the value is defined as a maximum value.

2. The secure index generation device of claim 1, wherein in the case where the minimum amount that can be taken by the value is defined as the minimum value, the secure index generation device treats a set of more than one value from the minimum value to the value as a word set and generates a first secure index based on the word set, the first identification information, and the key, and in the case where the maximum amount that can be taken by the value is defined as the maximum value, the secure index generation device treats the set of more than one value from the maximum value to the value as the word set, generates a second secure index based on the word set, the first identification information, and the key, and pairs the first secure index with the second secure index.

3. The secure index generation device of claim 1, wherein the secure index generation device treats, as a word set, a set of all intervals that contain the value within a range of values the value can take and generates the secure index based on the word set, the first identification information, and the key.

4. The secure index generation device of claim 1, wherein the scope search is performed on a database in which registered information is encrypted.

5. The secure index generation device of claim 1, wherein an index for executing the scope search is generated for a range of values equal to or greater than a first predetermined value and equal to or less than a second predetermined value.

6. A search system that generates a secure index and performs assessment processing on the generated secure index, the system comprising:
   a secure index generation device configured to generate the secure index;
   a trapdoor generation unit configured to, based on the key and a value to be searched, generate trapdoor information of the value to be searched; and
   a secure index search unit configured to, by use of the trapdoor information, perform secure index assessment processing to the generated secure index and, in a case where it is assessed through the assessment processing that the value to be searched is contained in the secure index, output second identification information for identifying the secure index,
   the secure index generation device receiving a plurality of values, first identification information for identifying each of the plurality of values, and a key as inputs and generates a secure index based on the inputs,
   the secure index generation device comprising:
   a value set generation unit configured to generate a value set based on the plurality of values, the value set being determined so as to correspond to a condition for a scope search; and
   a secure index generation unit configured to treat the value set as a word set and generate a secure index based on the word set, the first identification information, and the key,
   wherein:
      the secure index generation device treats a set of more than one value from the minimum value to the value as a word set and generates a secure index based on the word set, the first identification information, and the key, in a case where a minimum amount that can be taken by the value is defined as a minimum value, or
      the secure index generation device treats a set of more than one value from the maximum value to the value as a word set and generates a secure index based on the word set, the first identification information, and the key, in a case where a maximum amount that can be taken by the value is defined as a maximum value.

7. The search system of claim 6, wherein
   a value is assigned to any interval,
   a set of intervals to which the value is assigned is treated as a word set in place of the value set and a secure index is generated based on the word set, the first identification information, and the key, based on an interval assigned to a value to be searched and a key, trapdoor information of the value to be searched is generated, and by use of the trapdoor information, secure index assessment processing is performed to the generated secure index and, in a case where it is assessed through the assessment processing that the interval that is assigned to the value to be searched is contained in the secure index, second identification information for identifying the secure index is output.

8. A search system that generates a secure index and performs assessment processing on the generated secure index, the system comprising:
a secure index generation device configured to generate the first secure index and the second secure index, and the system further comprising:
a trapdoor generation unit configured to generate trapdoors t_a and t_b for each of input values a and b which meet the inequality a<b; and
a secure index search unit configured to perform secure index assessment processing using the trapdoor t_a as a trapdoor used in search processing with the first secure index and the trapdoor t_b as a trapdoor used in search processing with the second secure index and outputs a product set of results from each performance of assessment processing,
the secure index generation device receiving a plurality of values, first identification information for identifying each of the plurality of values, and a key as inputs and generates a secure index based on the inputs,
the secure index generation device comprising:
a value set generation unit configured to generate a value set based on the plurality of values, the value set being determined so as to correspond to a condition for a scope search; and
a secure index generation unit configured to treat the value set as a word set and generate a secure index based on the word set, the first identification information, and the key, wherein
in a case where a minimum amount that can be taken by the value is defined as a minimum value, the secure index generation device treats a set of more than one value from the minimum value to the value as a word set and generates a first secure index based on the word set, the first identification information, and the key, and
in a case where a maximum amount that can be taken by the value is defined as a maximum value, the secure index generation device treats a set of more than one value from the maximum value to the value as a word set, generates a second secure index based on the word set, the first identification information, and the key, and pairs the first secure index with the second secure index.

9. A search system that generates a secure index and performs assessment processing on the generated secure index, the system comprising:
a secure index generation device configured to generate the secure index, and the system further comprising:
a trapdoor generation unit configured to, based on the key and an interval that contains a value to be searched, generate trapdoor information of the value to be searched; and
a secure index search unit configured to, by use of the trapdoor information, perform secure index assessment processing to the generated secure index and, in a case where it is assessed through the assessment processing that the interval that contains the value to be searched is contained in the secure index, output second identification information for identifying the secure index,
the secure index generation device receiving a plurality of values, first identification information for identifying each of the plurality of values, and a key as inputs and generates a secure index based on the inputs,
the secure index generation device comprising:
a value set generation unit configured to generate a value set based on the plurality of values, the value set being determined so as to correspond to a condition for a scope search; and
a secure index generation unit configured to treat the value set as a word set and generate a secure index based on the word set, the first identification information, and the key,
wherein the index generation device treats, as a word set, a set of all intervals that contain the value within a range of values the value can take and generates a secure index based on the word set, the first identification information, and the key.

10. A search method in which a plurality of values, first identification information for identifying the plurality of values, and a key are received as inputs, a secure index is generated based on the inputs, and assessment processing is performed to the generated secure index, the method comprising:
generating a value set based on the plurality of values, the value set being determined so as to correspond to a condition for a scope search;
treating the value set as a word set and generating a secure index based on the word set, the first identification information, and the key;
based on the key and a value to be searched, generating trapdoor information of the value to be searched; and
by use of the trapdoor information, performing secure index assessment processing to the generated secure index and, in a case where it is assessed through the assessment processing that the value to be searched is contained in the secure index, outputting second identification information for identifying the secure index,
wherein:
a set of more than one value from the minimum value to the value is treated as a word set and a secure index is generated based on the word set, the first identification information, and the key, in a case where a minimum amount that can be taken by the value is defined as a minimum value, or
a set of more than one value from the maximum value to the value is treated as a word set and a secure index is generated based on the word set, the first identification information, and the key, in a case where a maximum amount that can be taken by the value is defined as a maximum value.

11. A non-transitory computer readable medium storing a secure index generation program for a secure index generation device that receives a plurality of values, first identification information for identifying each of the plurality of values, and a key as inputs and generates a secure index based on the inputs, the secure index generation program making a computer function as the secure index generation device comprising:

a value set generation unit configured to generate a value set based on the plurality of values, the value set being determined so as to correspond to a condition for a scope search; and a secure index generation unit configured to treat the value set as a word set and generate a secure index based on the word set, the first identification information, and the key, wherein:

a set of more than one value from the minimum value to the value is treated as a word set and a secure index is generated based on the word set, the first identification information, and the key, in a case where a minimum amount that can be taken by the value is defined as a minimum value, or a set of more than one value from the maximum value to the value is treated as a word set and a secure index is generated based on the word set, the first identification information, and the key, in a case where a maximum amount that can be taken by the value is defined as a maximum value.

* * * * *